(12) United States Patent
Parra-Yepez

(10) Patent No.: US 11,582,595 B2
(45) Date of Patent: *Feb. 14, 2023

(54) FACILITATION OF MACHINE TYPE COMMUNICATION FIRMWARE OVER THE AIR

(71) Applicant: AT&T Intellectual Property I, L.P., Atlanta, GA (US)

(72) Inventor: Darwin Parra-Yepez, Cedar Park, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 35 days.

This patent is subject to a terminal disclaimer.

(21) Appl. No.: 17/210,472

(22) Filed: Mar. 23, 2021

(65) Prior Publication Data

US 2021/0211864 A1 Jul. 8, 2021

Related U.S. Application Data

(63) Continuation of application No. 16/789,716, filed on Feb. 13, 2020, now Pat. No. 10,986,489.

(Continued)

(51) Int. Cl.
*H04W 8/22* (2009.01)
*H04W 68/02* (2009.01)
*H04W 60/00* (2009.01)

(52) U.S. Cl.
CPC ............ *H04W 8/22* (2013.01); *H04W 60/00* (2013.01); *H04W 68/02* (2013.01)

(58) Field of Classification Search
CPC ..... H04W 12/08; H04W 48/14; H04W 76/28; H04W 50/00

(Continued)

(56) References Cited

U.S. PATENT DOCUMENTS 5,483,688 A 1/1996 English et al.
7,283,969 B1 * 10/2007 Marsico ............... H04M 3/436
379/211.01

(Continued)

FOREIGN PATENT DOCUMENTS

| JP | 2019-525690 A | 9/2019 | |
|---|---|---|---|
| WO | WO-2014044951 A1 * | 3/2014 | ............ H04L 63/08 |
| WO | WO-2015036755 A1 * | 3/2015 | ......... G06Q 20/3276 |

OTHER PUBLICATIONS

A. Buvaneswari, L. Drabeck, N. Nithi, M. Haner, p. Polakos and C. Sawkar, "Self-optimization of LTE networks utilizing Celnet Xplorer," in Bell Labs Technical Journal, vol. 15, No. 3, pp. 99-117, Dec. 2010, doi: 10.1002/bltj.20459. (Year: 2010).*

(Continued)

*Primary Examiner* — William D Cumming
(74) *Attorney, Agent, or Firm* — Amin, Turocy & Watson, LLP

(57) ABSTRACT

A more efficient over-the-air software push can be facilitated by a firmware over-the-air (FOTA) server device in communication with a home subscriber server (HSS). For example, the FOTA server can host the names of user equipment devices that are due for a FOTA update. When a user equipment device identification is received from the HSS, the FOTA server can then check the user equipment device identification against the names within the server. If the name is found, then the system can send discontinuous reception data to the user equipment device to modify a current discontinuous reception value of the user equipment device. Thus, the modified discontinuous reception value can prompt a long reception time of the user equipment device such that the user equipment device can receive the FOTA.

20 Claims, 10 Drawing Sheets

Related U.S. Application Data

(60) Provisional application No. 62/952,796, filed on Dec. 23, 2019.

(58) Field of Classification Search
USPC .............. 455/433; 379/211.01; 370/242, 412
See application file for complete search history.

(56) References Cited

U.S. PATENT DOCUMENTS

| | | | |
|---|---|---|---|
| 7,515,534 B2 * | 4/2009 | Sumita | H04L 47/30 370/231 |
| 7,831,231 B2 | 11/2010 | Albicker | |
| 8,164,442 B2 * | 4/2012 | Ungari | G09B 29/10 345/173 |
| 8,169,631 B2 * | 5/2012 | Ohno | G06F 3/1238 358/1.14 |
| 8,279,067 B2 | 10/2012 | Berger et al. | |
| 8,374,297 B2 | 2/2013 | Komaili et al. | |
| 8,483,953 B2 * | 7/2013 | Umezu | G09B 29/106 701/410 |
| 8,971,884 B2 * | 3/2015 | Ahluwalia | H04W 48/14 370/242 |
| 9,582,233 B1 * | 2/2017 | Osadchyy | H04L 41/0677 |
| 9,699,703 B2 | 7/2017 | Ogawa et al. | |
| 9,918,220 B1 | 3/2018 | Chastain et al. | |
| 10,070,407 B2 | 9/2018 | Chastain et al. | |
| 10,136,305 B2 | 11/2018 | Chastain et al. | |
| 10,149,146 B2 | 12/2018 | Chastain et al. | |
| 10,212,615 B1 | 2/2019 | Jha et al. | |
| 10,212,690 B1 | 2/2019 | Lau et al. | |
| 10,356,605 B2 | 7/2019 | Chastain et al. | |
| 10,375,663 B2 | 8/2019 | Chastain et al. | |
| 10,420,070 B2 | 9/2019 | Lau et al. | |
| 10,484,965 B2 | 11/2019 | Tombaz et al. | |
| 10,506,459 B2 | 12/2019 | Jha et al. | |
| 10,555,164 B2 | 2/2020 | Chastain et al. | |
| 10,631,266 B2 | 4/2020 | Park et al. | |
| 10,877,820 B1 * | 12/2020 | Jaakola | G06F 9/544 |
| 10,986,489 B1 * | 4/2021 | Parra-Yepez | H04W 76/28 |
| 11,184,808 B2 | 11/2021 | Youn et al. | |
| 2005/0105639 A1 | 5/2005 | Tahara et al. | |
| 2005/0169290 A1 * | 8/2005 | Sumita | G06K 15/00 370/412 |
| 2006/0046765 A1 | 3/2006 | Kogure | |
| 2006/0223498 A1 * | 10/2006 | Gallagher | H04W 12/08 455/433 |
| 2009/0067850 A1 | 3/2009 | Mizutani et al. | |
| 2009/0115724 A1 | 5/2009 | Yamamoto | |
| 2009/0322510 A1 | 12/2009 | Berger et al. | |
| 2010/0063727 A1 * | 3/2010 | Umezu | G08G 1/0969 707/609 |
| 2010/0067622 A1 | 3/2010 | Komaili et al. | |
| 2010/0144384 A1 | 6/2010 | Kogure | |
| 2010/0182145 A1 * | 7/2010 | Ungari | G09B 29/10 345/173 |
| 2016/0239860 A1 * | 8/2016 | Ozawa | G06Q 20/3825 |
| 2018/0152831 A1 | 5/2018 | Chastain et al. | |
| 2018/0160292 A1 | 6/2018 | Chastain et al. | |
| 2018/0160385 A1 | 6/2018 | Chastain et al. | |
| 2018/0324736 A1 | 11/2018 | Chastain et al. | |
| 2019/0045353 A1 | 2/2019 | Chastain et al. | |
| 2019/0053039 A1 | 2/2019 | Chastain et al. | |
| 2019/0132751 A1 | 5/2019 | Jha et al. | |
| 2019/0141671 A1 | 5/2019 | Lau et al. | |
| 2019/0166577 A1 | 5/2019 | Tombaz et al. | |
| 2019/0182873 A1 | 6/2019 | Wass et al. | |
| 2019/0289457 A1 | 9/2019 | Chastain et al. | |
| 2019/0289571 A1 | 9/2019 | Park et al. | |
| 2019/0313333 A1 | 10/2019 | Kim et al. | |
| 2019/0320404 A1 | 10/2019 | Chastain et al. | |
| 2019/0335532 A1 | 10/2019 | Kim et al. | |
| 2019/0394625 A1 | 12/2019 | Kim et al. | |
| 2020/0029237 A1 | 1/2020 | Kim et al. | |
| 2020/0068470 A1 | 2/2020 | Gotou et al. | |
| 2020/0084717 A1 | 3/2020 | Hoglund et al. | |
| 2020/0220818 A1 | 7/2020 | Kountouris et al. | |
| 2021/0211864 A1 * | 7/2021 | Parra-Yepez | H04W 60/00 |

OTHER PUBLICATIONS

"IEEE Standard for Local and metropolitan area networks—Part 21: Media Independent Services Framework—Redline," in IEEE Std 802.21-2017 (Revision of IEEE Std 802.21-2008 as amended by IEEE Std 802.21a-2012, IEEE Std 802.21b-2012, IEEE Std 802.21c-2014, and IEEE Std 802.21d-2015)—Redline (Year: 2017).*

"Digital cellular telecommunications system (Phase 2+) (GSM); Universal Mobile Telecommunications System (UMTS); LTE; Architecture enhancements to facilitate communications with packet data networks and applications." 3GPP TS 23.682 version 15.5.0 Release 15, Jul. 2018. 127 pages.

Office Action dated Jun. 16, 2020 for U.S. Appl. No. 16/789,716, 27 pages.

Office Action dated Sep. 24, 2020 for U.S. Appl. No. 16/789,716, 18 pages.

Notice of Allowance dated Dec. 23, 2020 for U.S. Appl. No. 16/789,716, 29 pages.

Ngartabe Kag-Teube; Yvan Paillard Kalia-Sya Dodoagnen; Samuel Ouya; Keba Gueye, "Proposed solution for improving the reliability of HSS data by integrating a queue manager", 2018 20th International Conference on Advanced Communication Technology (ICACT) Mar. 2018 (Year: 2018), 9 pages.

* cited by examiner

FACILITATION OF MACHINE TYPE COMMUNICATION FIRMWARE OVER THE AIR

CROSS-REFERENCE TO RELATED APPLICATION

The subject patent application is a continuation of, and claims priority to, U.S. patent application Ser. No. 16/789,716 (now U.S. Pat. No. 10,986,489), filed Feb. 13, 2020, and entitled "FACILITATION OF MACHINE TYPE COMMUNICATION FIRMWARE OVER THE AIR," which applications each claim priority to U.S. Provisional Patent Application No. 62/952,796, filed Dec. 23, 2019, and entitled "FACILITATION OF MACHINE TYPE COMMUNICATION FIRMWARE OVER THE AIR." The entireties of the aforementioned applications are hereby incorporated by reference herein.

TECHNICAL FIELD

This disclosure generally relates to facilitating machine type communication (MTC) firmware over the air. More specifically, this disclosure relates to scheduling of over-the-air downloads for internet of things.

BACKGROUND

Over-the-air (OTA) programming or firmware OTA (FOTA) refers to various methods of distributing new software, configuring settings, and updating encryption keys to devices like cellphones, set-top boxes or secure voice communication equipment (encrypted 2-way radios). One feature of OTA is that one central location can send an update to all the users, who are unable to refuse, defeat, or alter that update, and that the update applies immediately to everyone on the channel.

In the context of the mobile content world these can comprise over-the-air service provisioning (OTASP), over-the-air provisioning (OTAP) or over-the-air parameter administration (OTAPA), or provisioning handsets with the necessary settings with which to access services such as wireless application protocols (WAP) or multimedia messaging services (MMS).

As mobile devices accumulate new applications and become more advanced, OTA configuration has become increasingly important as new updates and services come on stream. OTA via short messaging services (SMS) optimizes the configuration data updates in SIM cards and handsets and enables the distribution of new software updates to mobile devices or provisioning handsets with the necessary settings with which to access services such as WAP or MMS. OTA messaging provides remote control of mobile devices for service and subscription activation, personalization and programming of a new service for mobile operators and telecommunication third parties.

The above-described background relating to firmware over-the-air is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
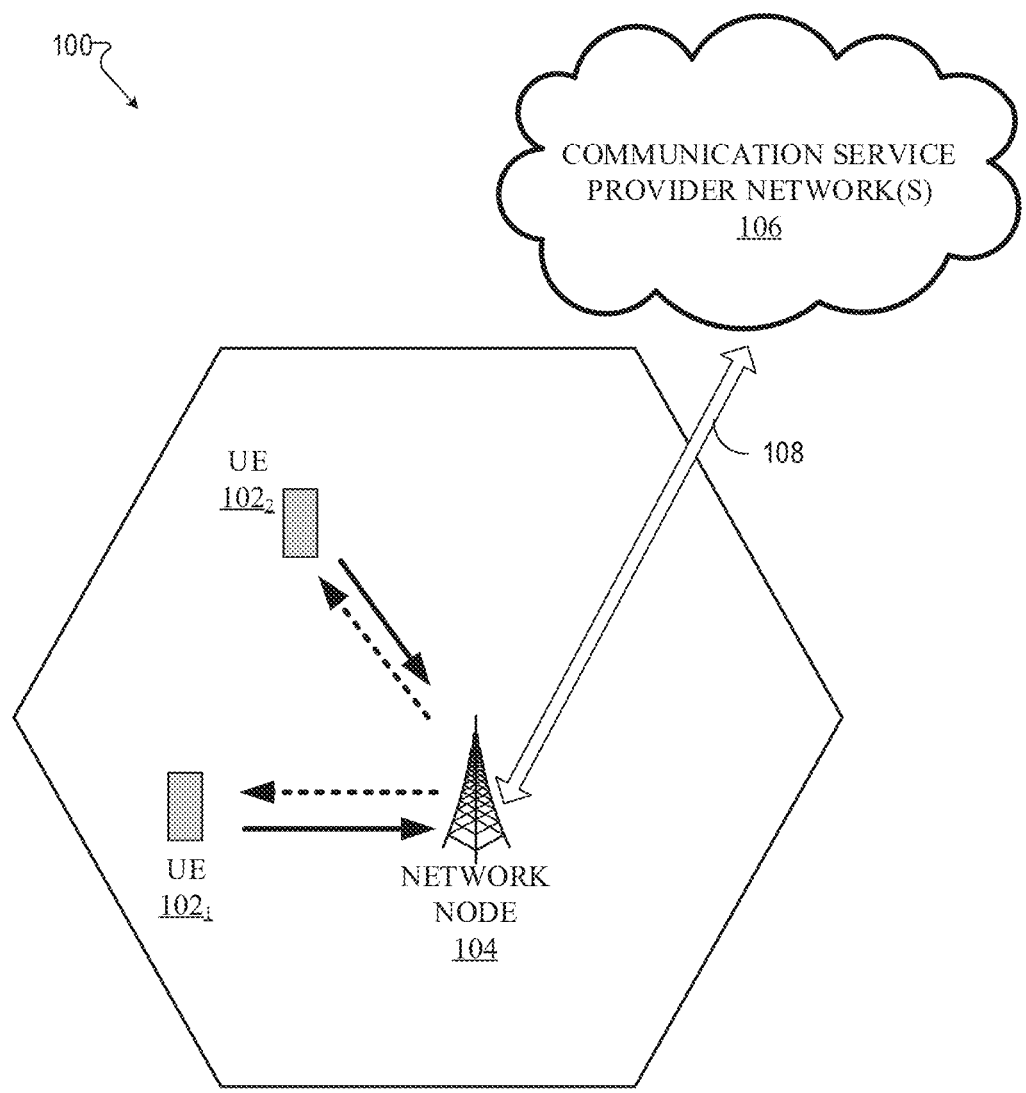
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate FOTA for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.12 technology. Additionally, substantially all aspects disclosed herein can be exploited in legacy telecommunication technologies.

Described herein are systems, methods, articles of manufacture, and other embodiments or implementations that can facilitate FOTA for a 5G network. Facilitating FOTA for a 5G network can be implemented in connection with any type of device with a connection to the communications network (e.g., a mobile handset, a computer, a handheld device, etc.) any Internet of things (IOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

MTC devices and networks (e.g., LTE M and NB-IoT) are designed and optimized for low power consumption, low data rates and infrequent use. The typical traffic pattern on these devices can comprise a short period of activity, on the order of a few seconds, followed by hours, days or even months of inactivity, during which the user equipment (UEs) are not reachable. These traffic characteristics are beneficial to expand battery life but creates a challenge for device management activities such as firmware upgrades, also known as FOTA, security patches, or provisioning changes that are periodically needed and that can occur while the UE is connected for tens of seconds instead of only a few seconds. This is especially difficult to manage when UEs are roaming in foreign radio access networks (RAN), but are still attached to a service provider's mobility management entities (MME). The MME can push FOTA to the UEs or modify their SIM profile such that the UE can attach to two different network operators based on roaming.

This disclosure utilizes the periodic registration, that UEs perform as part of their regular connectivity maintenance, to modify their regular behavior so that they stay connected to the network, longer than they would otherwise, to allow enough time for FOTA packages to be downloaded (e.g., greater than two minutes).

As built, the roaming system selection (RSS) platform typically takes 2-3 minutes from device registration until the RSS can initiate OTA via a mobile terminated short text message (MT-SMS) delivery download that contains the public land mobile network (PLMN) steering files for managing preferred roaming carriers network selection priority. A large population of IoT devices have a very short network presence availability in that they connect and disconnect very quickly. This is due to their power-up time (international mobile subscriber identity (IMSI) attach reachable) intervals are significantly less than 2 minutes with some modules with connection instances as short as 10 seconds. This is by design for device optimization for power conservation, but adversely limits the time these devices are reachable on the network for MT messaging attempts. The power-up time varies based on device category, features implemented (e.g., power saving mode (PSM), discontinuous reception (eDRX), etc.), module vendor and system integrator.

A new element called the FOTA server and database function can be attached to an home subscriber server (HSS) function in the LTE network. This element can contain a list of UEs that are due for FOTA upgrades. Whenever the MME receives a tracking area update (TAU) or attach request from one of these devices, the HSS can send a flag to the MME that triggers a response from the MME with custom extended idle-mode discontinuous reception timers (TeDRX), discontinuous reception timers (Tdrx), and/or paging transmission window timers (Tptw). These timer values are part of the flag sent from the HSS and can be negotiated between the UE and the MME independently of the RAN in use. These modifications can be performed on a case-by-case basis (e.g., the modified behavior is triggered by this "FOTA pending" flag) and can follow regular procedures (e.g., whatever timer values are set for the RAN at that point) if the device is not due for push. Thus, the network can tell the UE when to wake up (e.g., wake up your receivers every 20 ms), how long to stay awake, when to page, and when to go back to sleep (e.g., power saving mode). Because the network has indicated to the UE when to wake up, the network will know when to send the FOTA within those specific time slots.

In case the device or the network does not support eDRX, a similar approach can be taken manipulating a power saving mode (PSM) (e.g., timer T3324) timer (making it longer) as is also negotiated upon attach and TAU between UE and MME. For example, the T3324 can prompt the UE to wait a specific amount of time before the UE goes completely off. However, another timer can prompt the UE to wake up at various intervals. Thus, for FOTA upgrades, the UE idle time can be extended to prevent the UE from going completely dormant.

It should also be noted that an artificial intelligence (AI) component can facilitate automating one or more features in accordance with the disclosed aspects. A memory and a processor as well as other components can include functionality with regard to the figures. The disclosed aspects in connection with FOTA can employ various AI-based schemes for carrying out various aspects thereof. For example, a process for detecting one or more trigger events, reducing a software push as a result of the one or more trigger events, and modifying one or more reported measurements, and so forth, can be facilitated with an example automatic classifier system and process.

An example classifier can be a function that maps an input attribute vector, $x=(x1, x2, x3, x4, xn)$, to a confidence that the input belongs to a class, that is, $f(x)$=confidence (class). Such classification can employ a probabilistic and/or statistical-based analysis (e.g., factoring into the analysis utilities and costs) to prognose or infer an action that can be automatically performed. In the case of FOTA pushes, for example, attributes can be a frequency band and a technology and the classes can be an output network capacity reduction value.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via a generic training data) as well as implicitly trained (e.g., via observing mobile device usage as it relates to triggering events, observing network frequency/technology, receiving extrinsic information, and so on). For example, SVMs can be configured via a learning or training phase within a classifier constructor and feature selection module. Thus, the classifier(s) can be used to automatically learn and perform a number of functions, including but not limited to modifying a FOTA push, modifying one or more reported mobility measurements, and so forth. The criteria can include, but is not limited to, predefined values, frequency attenuation tables or other parameters, service provider preferences and/or policies, and so on.

In one embodiment, described herein is a method comprising receiving, by a wireless network device comprising a processor, registration data representative of a mobile device attempting to register with a wireless network. In response to the receiving the registration data, the method can comprise sending, by the wireless network device, the registration data to a server device of the wireless network. In response to the sending the registration data to the server device, the method can comprise receiving, by the wireless network device from the server device, update data representative of an indication that the mobile device is ready for application of a firmware update. Additionally, in response to the receiving the update data, the method can comprise prompting, by the wireless network device, a mobility management device to modify a discontinuous reception parameter of the mobile device.

According to another embodiment, a system can facilitate, receiving registration data representative of a mobile device attempting to register with a wireless network. In response to the receiving the registration data, the system can comprise sending the registration data to a server device of the wireless network. Additionally, in response to the sending the registration data to the server device, the system can comprise facilitating comparing the update data to a data structure of the server device, resulting in comparison data. Furthermore, based on the comparison data, the system can comprise modifying a discontinuous reception parameter associated with the mobile device, resulting in a modified discontinuous reception parameter.

According to yet another embodiment, described herein is a machine-readable storage medium that can perform the operations comprising receiving tracking area update data representative of a mobile device initiating a registration with a base station device of a wireless network. In response to the receiving the tracking area update data, the machine-readable storage medium can perform the operations comprising sending the tracking area update data to a server device of the wireless network. Furthermore, in response to the sending the tracking area update data to the server device, the machine-readable storage medium can perform the operations comprising facilitating comparing the tracking area update data to a data structure of the server device, resulting in comparison data. Additionally, based on the comparison data, the machine-readable storage medium can perform the operations comprising modifying a reception value associated with the mobile device, resulting in a modified reception value.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD), LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
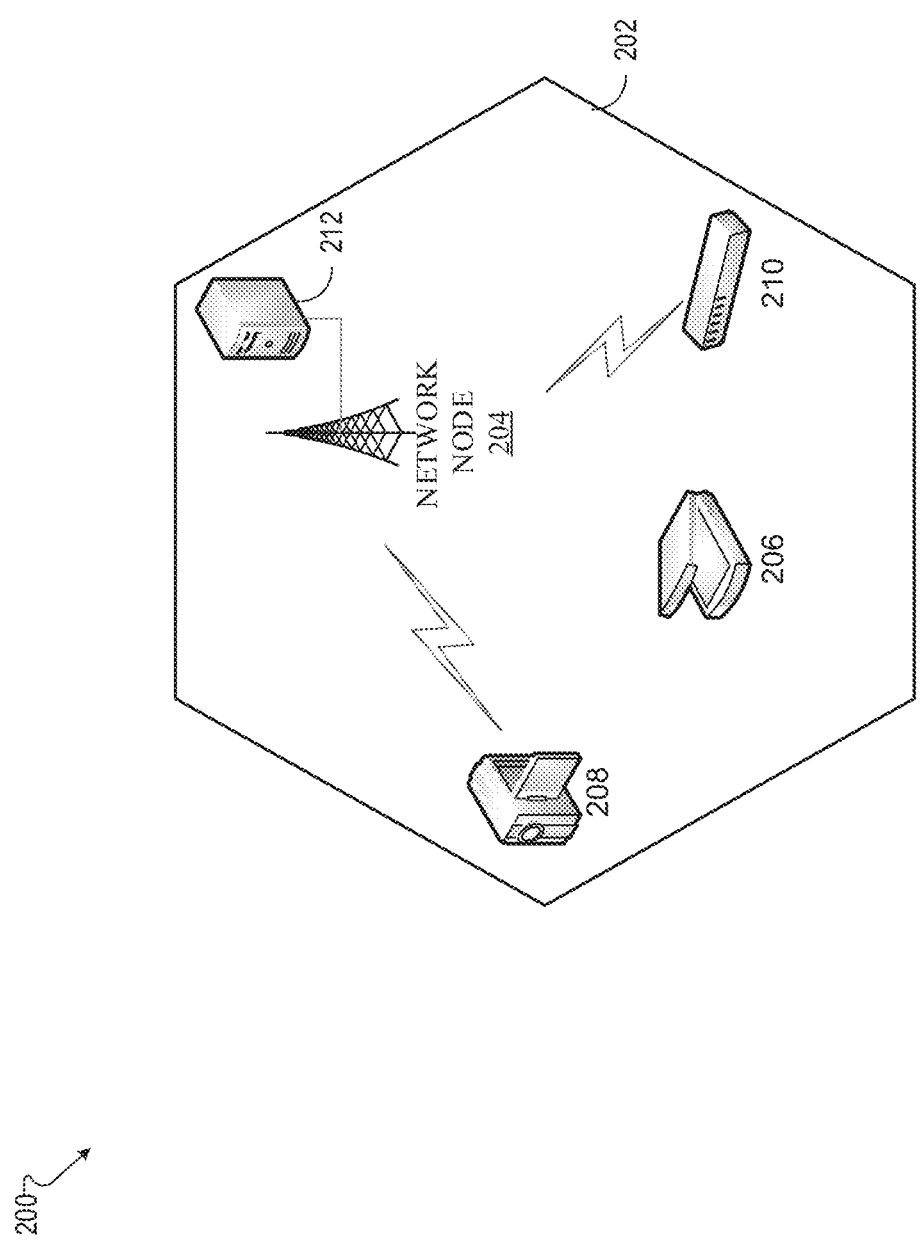
FIG. 2 illustrates an example schematic system block diagram of a base station in communication to IOT devices.

Referring now to FIG. 2, illustrated is an example schematic system block diagram of a base station in communication to IOT devices. As depicted by FIG. 2, several IOT devices 206, 208, 210 (e.g., UE 102) can be connected to a base station device 204 because that are within a specific geographic area 202. Additionally, the base station device 204 can be connected to a FOTA server 212 via the HSS of the RAN. It should note that although the IOT devices 206, 208, 210 can be connected to the base station device 204, depending on the eDRX procedures associated with the IOT devices 206, 208, 210, only the IOT devices 208, 210 can receive FOTA during a specific time. Thus, FIG. 2 depicts the scenario where the IOT devices 206 receiver is off to save power/resources and is currently not capable of receiving any FOTA. However, IOT devices 208, 210 have had their identities confirmed firmed between the HSS and the FOTA server. Consequently, the eDRXs of the IOT devices 208, 210 have been modified such that the IOT devices 208, 210 receivers are on and are capable of receiving FOTA at the specified time.

Figure 3:
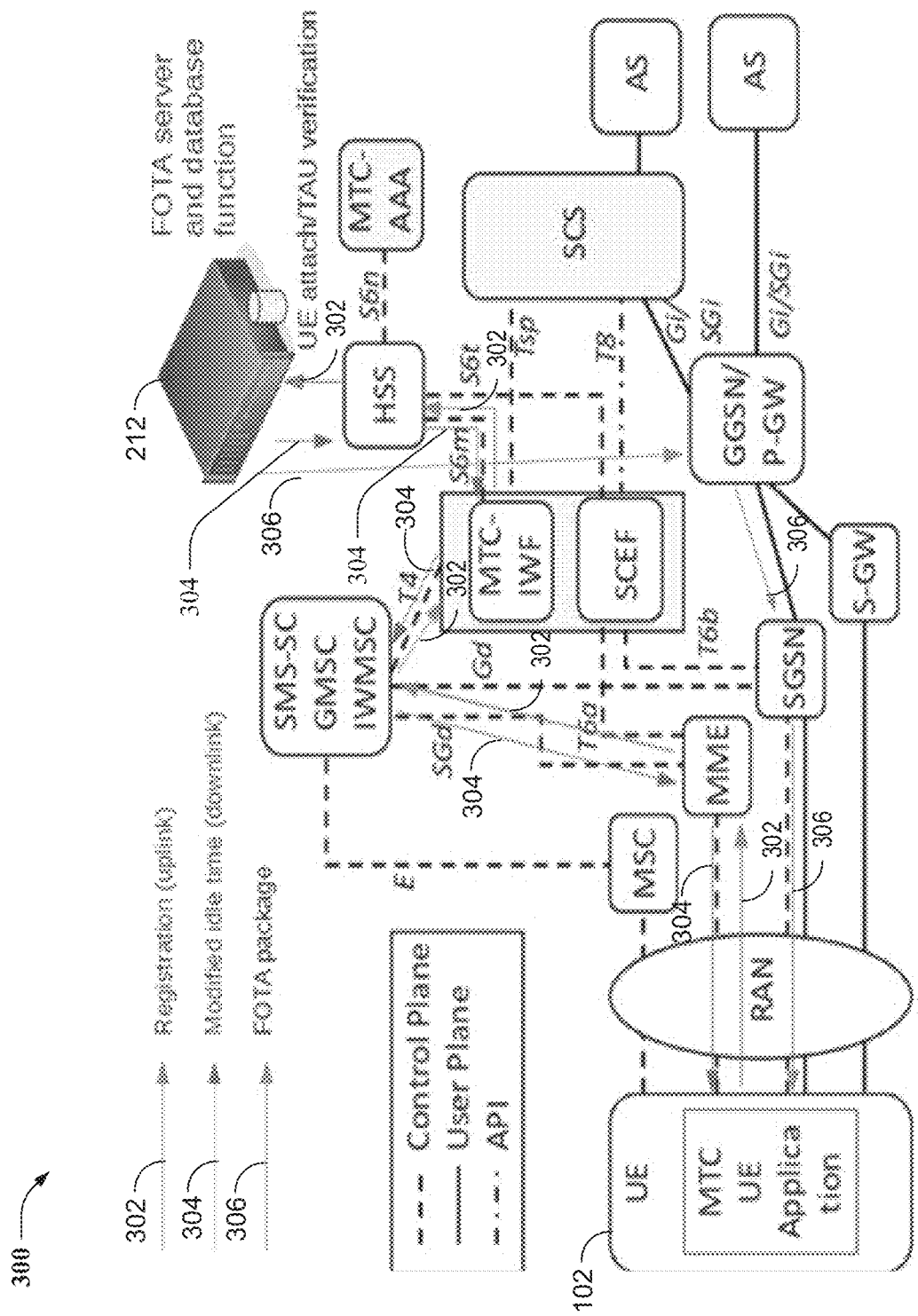
FIG. 3 illustrates an example schematic system block diagram of a wireless network architecture.

Referring now to FIG. 3, illustrated is an example schematic system block diagram of a wireless network architecture 300.

Manipulating extended discontinuous reception (eDRX) procedures at will can keep the UE 102 connected to the network long enough such that the firmware updates are received by the UEs 102. The FOTA can be sent by defining a dynamic profile whereby the mobility management entity (MME) sends a timer (e.g., modified idle timer via path 304) to the UE 102. Generally, the UE 102 can determine when to wake up and when to disconnect from a session. However, in this scenario, the MME can communicate (e.g., send a flag to the UE 102) to the UE 102 how long to stay connected on a particular session. For example, if there are a list of UEs that are due for an update, then this list can be pushed to a database (e.g., FOTA server 212). Whenever a registration or tracking area update is received from one of these UEs, then the UEs can be provided with parameters from the network on how the UEs are to behave on the network. Thus, the parameters received by the UE 102 can comprise the eDRX values.

The UE 102 can comprise an MTC application that can register with the MME (via path 302). The registration data can then be sent to the short message service center (SMS-SC), gateway mobility switching center (GMSC), and/or the interworking mobility switching center (IWMSC) before going to the machine type communication inter-working function (MTC-IWF). The registration data (comprising UE 102 identification data) can then be sent to the home subscriber server (HSS), which can then check with the FOTA server 212 and database function to determine if the UE 102 is due for an update or not. Thus, the system can compare the registration data to a data structure of the FOTA server 212 to determine if the UE 102 is due for an update. It should be noted that the comparison can take place at the HSS or the FOTA server 212. If the UE 102 is due for an update, this information can flow from the HSS to the MTC-IWF to the SMS-SC, GMSC, and/or IWMSC to the MME (via path 304). Therefore, the HSS can prompt the MME (via path 304) to modify the eDRX in accordance with the FOTA schedule and send this data back through the RAN to the UE 102 (via path 304). The flag data for the eDRX can be encapsulated in one of the messages (or a new message) (via path 304), wherein the MME can signal to the UE 102 that for this particular session, the eDRX will be longer than usual. For example, the flag data can indicate that the eDRX parameters are three minutes for a particular session. It should be noted that in some embodiments, the eDRX parameters can be associated with a future session based on machine learning, UE 102 history, and/or a predicted or scheduled future FOTA. If the UE 102 is not due for an upgrade, then the UE 102 can remain on or off in accordance with its default parameters. After the UE 102 has received the FOTA (via path 306) in accordance with the modified eDRX parameters, then the UE 102 can perform on its regularly schedule wake-up and sleep schedule. Thus, when the UE 102 is awake based on the modified eDRX parameters, the FOTA server 212 can facilitate sending the FOTA to the UE 102 via the gateway general packet radio service support node (GGSN)/packet gateway (P-GW) to the serving general packet radio service support node (SGSN) and through the RAN to the UE 102. As depicted in FIG. 3, it should be noted that other network functions can be utilized to facilitate the above-noted procedures including, but not limited to: service capability exposure function (SCEF), service capability server (SCS), service gateway (S-GW), application server (AS), MTC authorization, authentication and accounting (AAA) function, etc.

Figure 4:
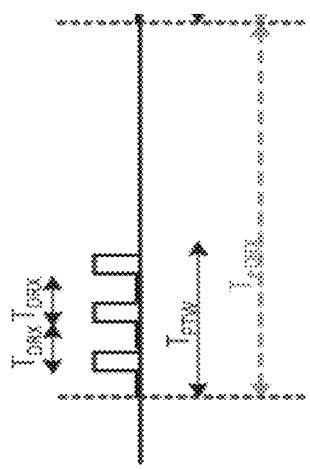
FIG. 4 illustrates an example schematic system block diagram of a discontinuous reception function.

Referring now to FIG. 4, illustrated is an example schematic system block diagram of a discontinuous reception function 400. A DRX cycle defines an "on" duration during which the UE 102 can monitor for possible physical downlink control channel (PDCCH) transmissions. During this period, the radio is active and the UE 102 can transmit and receive. The DRX cycled is part of a UE's 102 radio resource control (RRC) configuration. During the "off" duration, the UE 102 is not expected to transmit or receive anything. DRX was originally designed for energy savings procedure and UE power consumption optimization. The DRX configuration of a cell may be cell specific (identical for all UEs) or UE specific, (e.g., each UE) can receive its dedicated DRX configuration. Several DRX configurations can be defined (e.g., a short and a long one).

Figure 5:
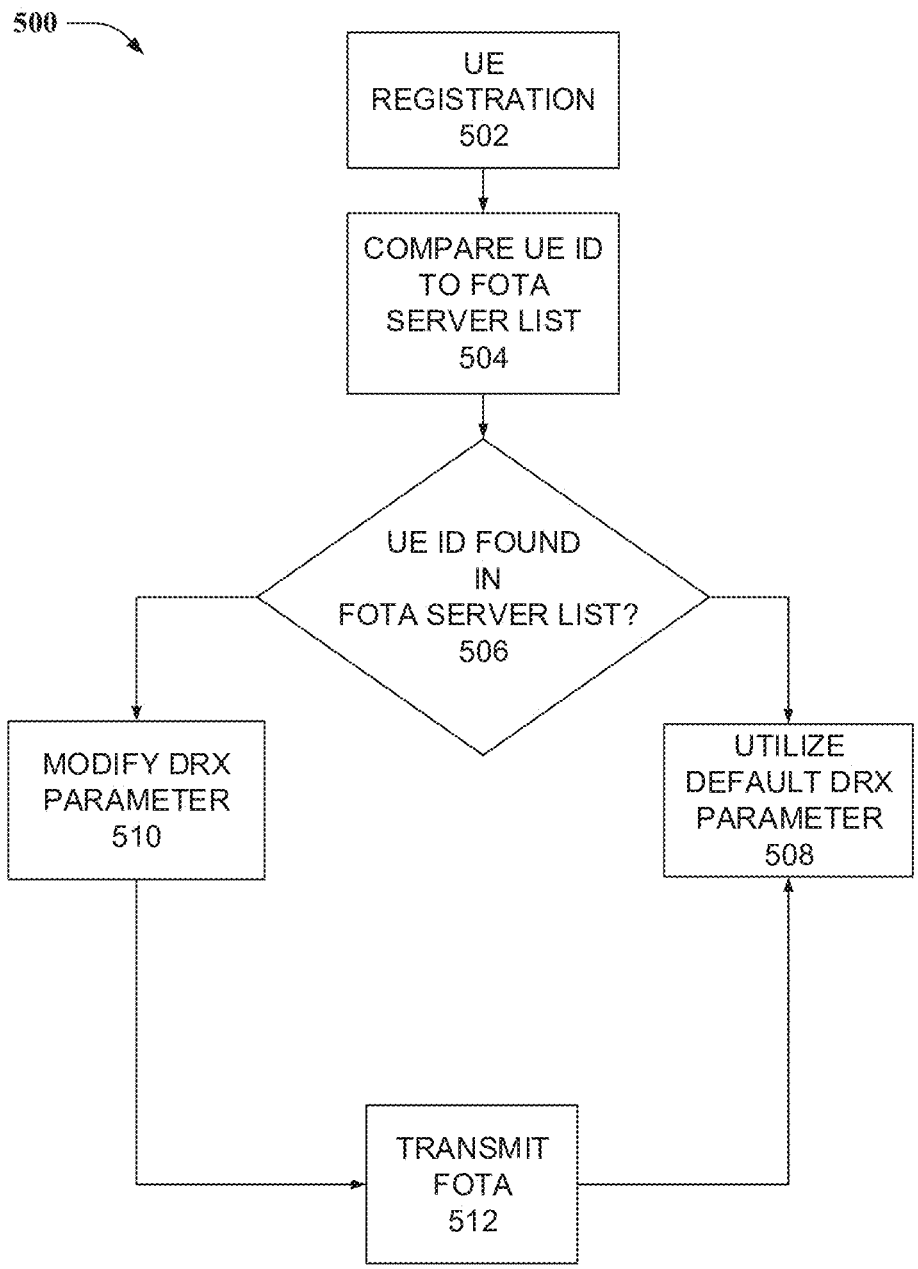
FIG. 5 illustrates an example flow diagram for a wireless network architecture.

Referring now to FIG. 5, illustrated is an example flow diagram 500 for a wireless network architecture.

At block 502, the UE 102 can register with the MME (via path 302). The registration data can then be sent to the HSS. At block 504, the system can compare the registration data to a list of UEs (that are due for an update), within the FOTA server 212 and database function, to determine if the UE 102 is due for an update or not. Thus, the system can compare the registration data to a data structure of the FOTA server 212. It should be noted that the comparison can take place at the HSS (e.g., the FOTA server 212 sends the list to the HSS) or the comparison can be performed at the FOTA server 212. Based on the comparison, if it is determined that the UE 102 is due for an update at block 506, this information can be sent from the to the MME (via path 304) to modify the DRX parameter at block 510 in accordance with the FOTA schedule. Based on the modified eDRX parameter, the system can transmit the FOTA to the UE 102 at block 512. Subsequent to the transmission, the UE 102 can utilize a default DRX (e.g., the DRX prior to the DRX modification) at block 508. Alternatively, if the UE ID is not found in the FOTA server list at block 506, then the UE 102 can proceed to utilize the default DRX parameter at block 508.

Figure 6:
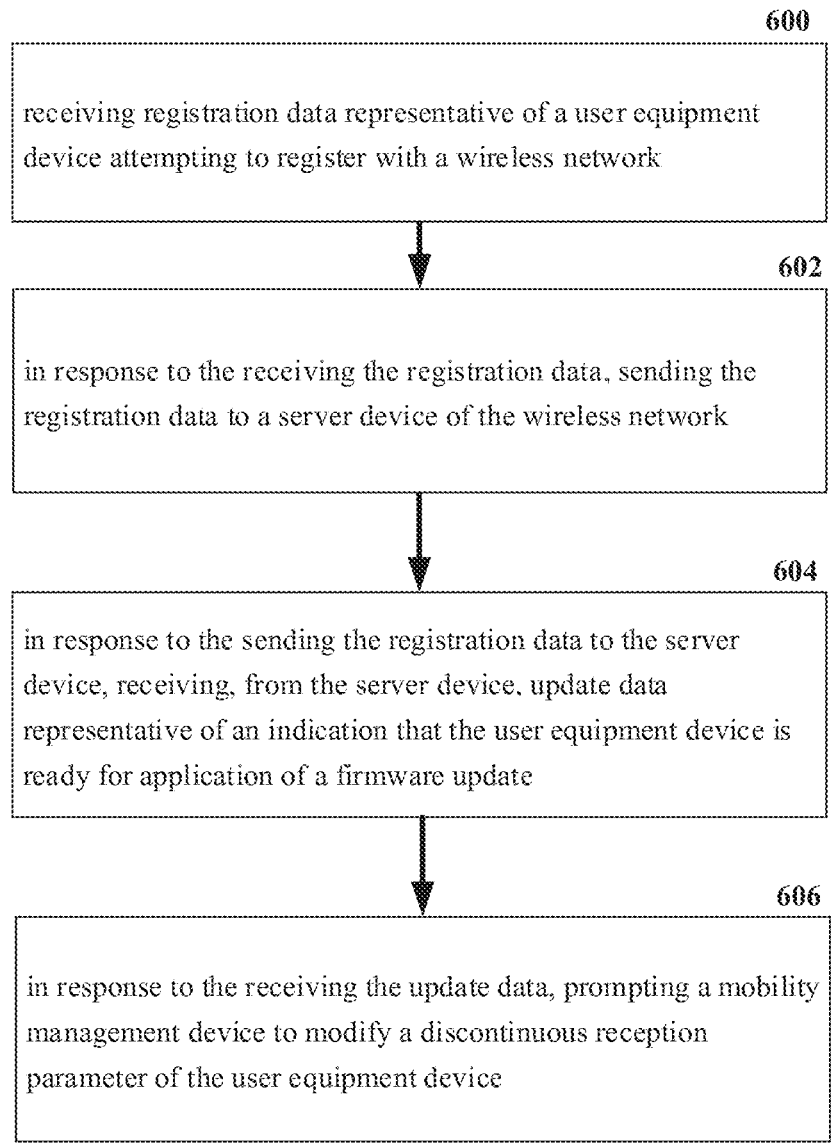
FIG. 6 illustrates an example flow diagram of a method for modifying a discontinuous reception parameter.

Referring now to FIG. 6, illustrated is an example flow diagram of a method for modifying a discontinuous reception parameter. At element 600, a method can comprise receiving registration data representative of a mobile device attempting to register with a wireless network. In response to the receiving the registration data, at element 602, the method can comprise sending the registration data to a server device of the wireless network. In response to the sending the registration data to the server device, at element 604, the method can comprise receiving, from the server device, update data representative of an indication that the mobile device is ready for application of a firmware update. Additionally, at element 606, in response to the receiving the update data, the method can comprise prompting a mobility management device to modify a discontinuous reception parameter of the mobile device.

Figure 7:
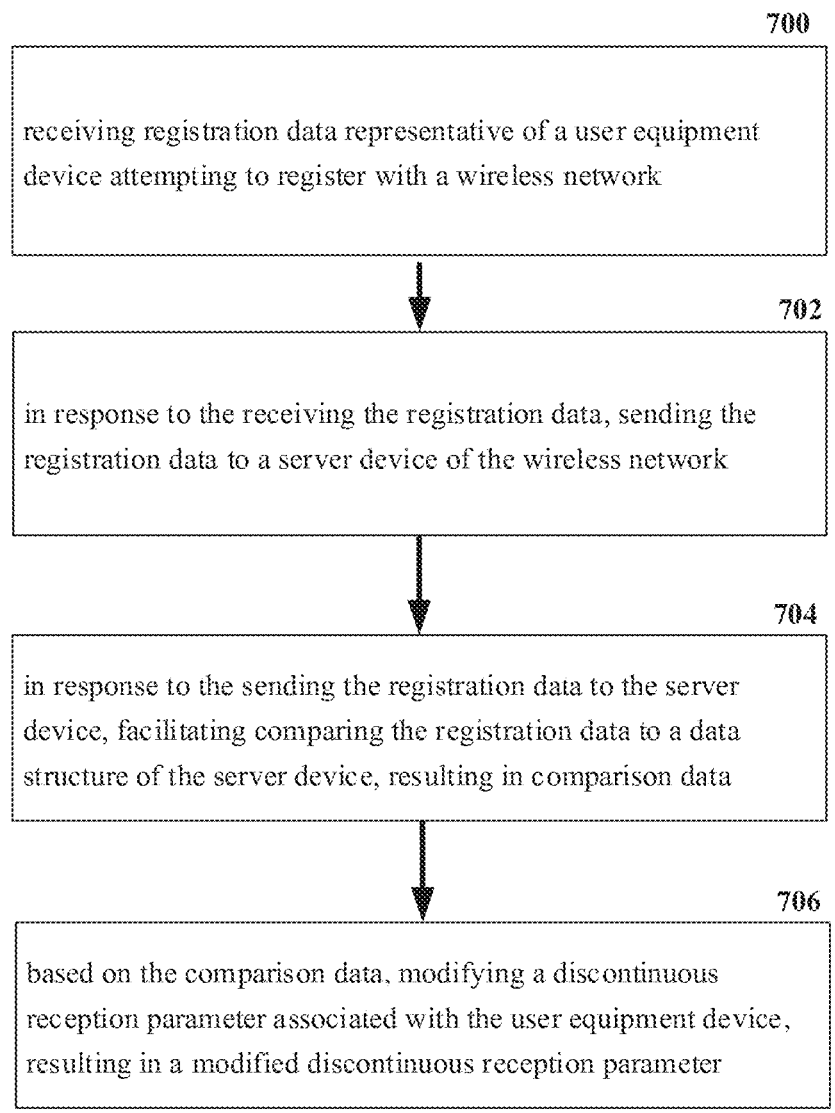
FIG. 7 illustrates an example flow diagram of a system for modifying a discontinuous reception parameter.

Referring now to FIG. 7, illustrated is an example flow diagram of a system for modifying a discontinuous reception parameter. At element 700 a system can facilitate, receiving registration data representative of a mobile device attempting to register with a wireless network. At element 702, in response to the receiving the registration data, the system can comprise sending the registration data to a server device of the wireless network. Additionally, in response to the sending the registration data to the server device, at element 704, the system can comprise facilitating comparing the update data to a data structure of the server device, resulting in comparison data. Furthermore, at element 706, based on the comparison data, the system can comprise modifying a discontinuous reception parameter associated with the mobile device, resulting in a modified discontinuous reception parameter.

Figure 8:
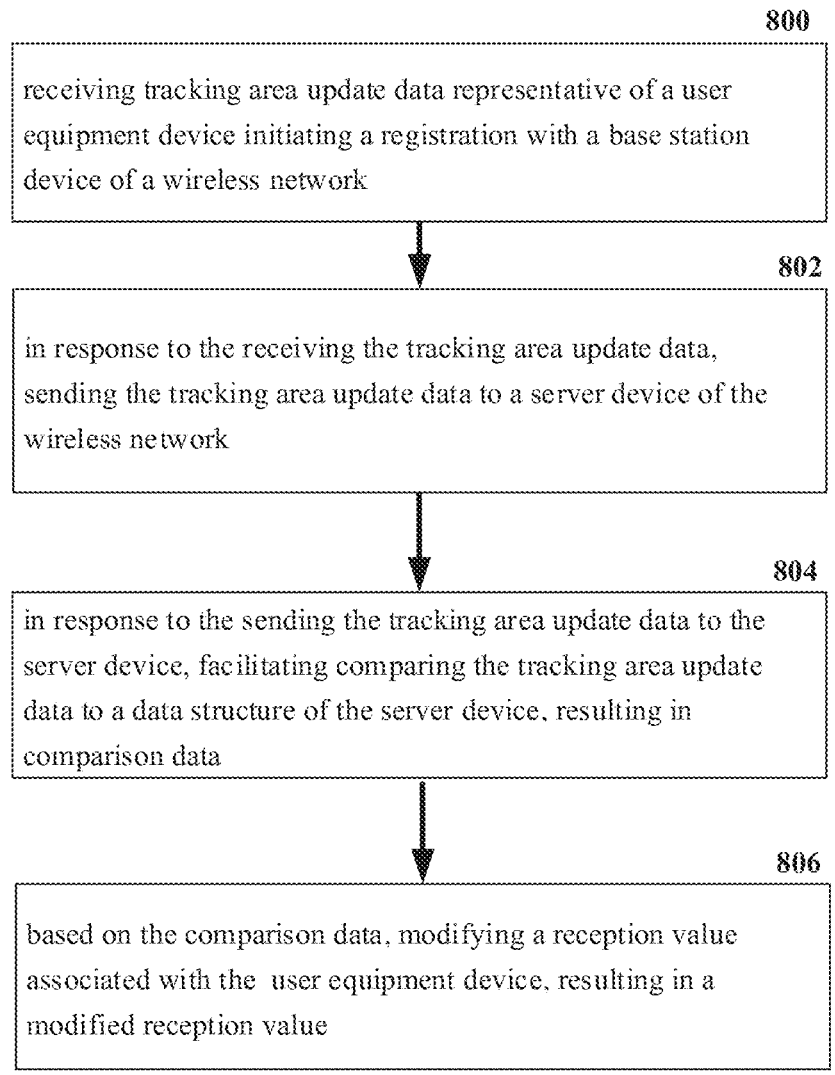
FIG. 8 illustrates an example flow diagram of a machine-readable medium for modifying a discontinuous reception parameter.

Referring now to FIG. 8, illustrated is an example flow diagram of a machine-readable medium for modifying a discontinuous reception parameter. At element 800, a machine-readable storage medium can perform the operations comprising receiving tracking area update data representative of a mobile device initiating a registration with a base station device of a wireless network. In response to the receiving the tracking area update data, the machine-readable storage medium can perform the operations comprising sending the tracking area update data to a server device of the wireless network at element 802. Furthermore, in response to the sending the tracking area update data to the server device, at element 804, the machine-readable storage medium can perform the operations comprising facilitating comparing the tracking area update data to a data structure of the server device, resulting in comparison data. Additionally, based on the comparison data, at element 806, the machine-readable storage medium can perform the operations comprising modifying a reception value associated with the mobile device, resulting in a modified reception value.

Figure 9:
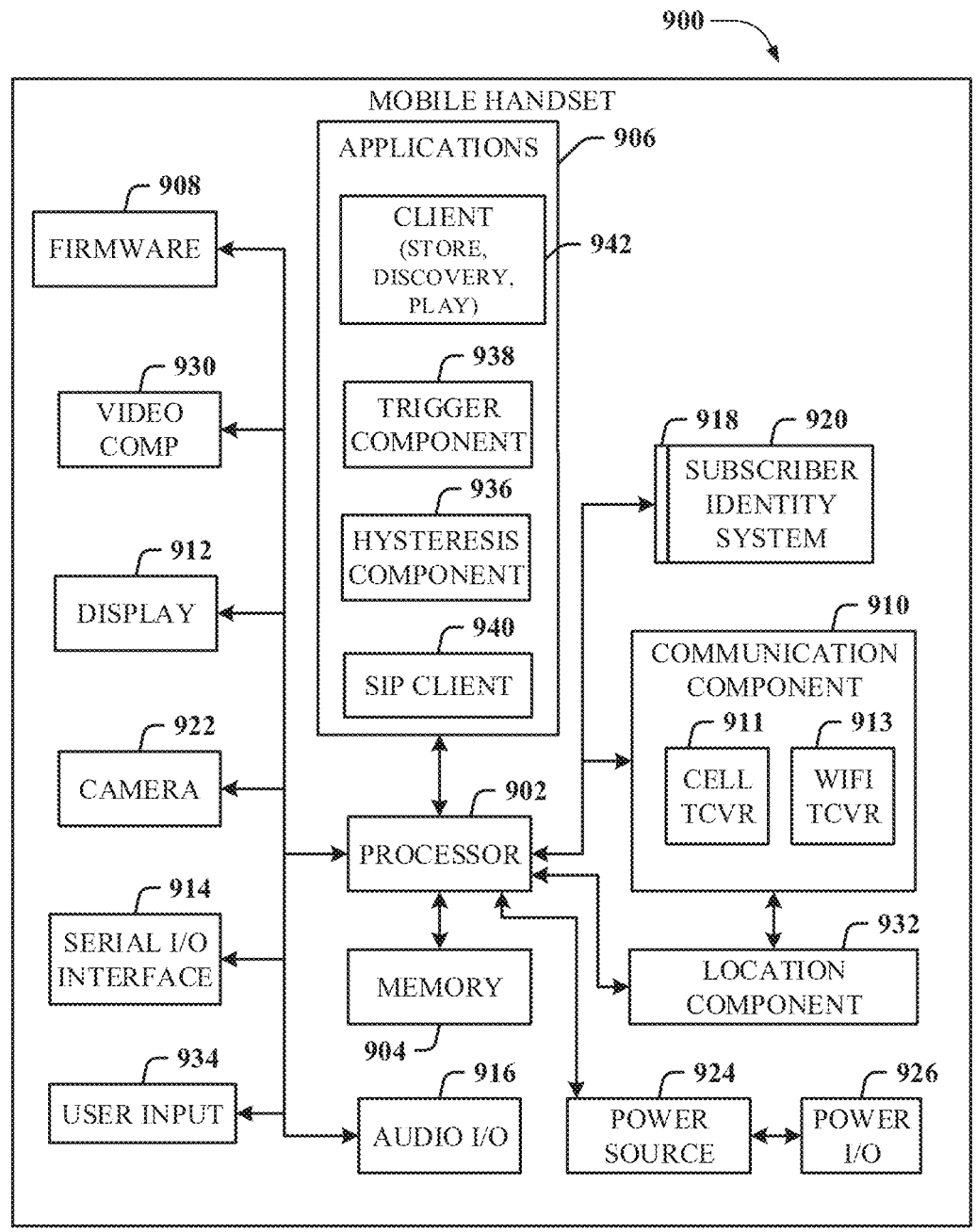
FIG. 9 illustrates an example block diagram of an example mobile handset operable to engage in a system architecture that facilitates secure wireless communication according to one or more embodiments described herein.

Referring now to FIG. 9, illustrated is a schematic block diagram of an exemplary end-user device such as a mobile device capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described herein, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
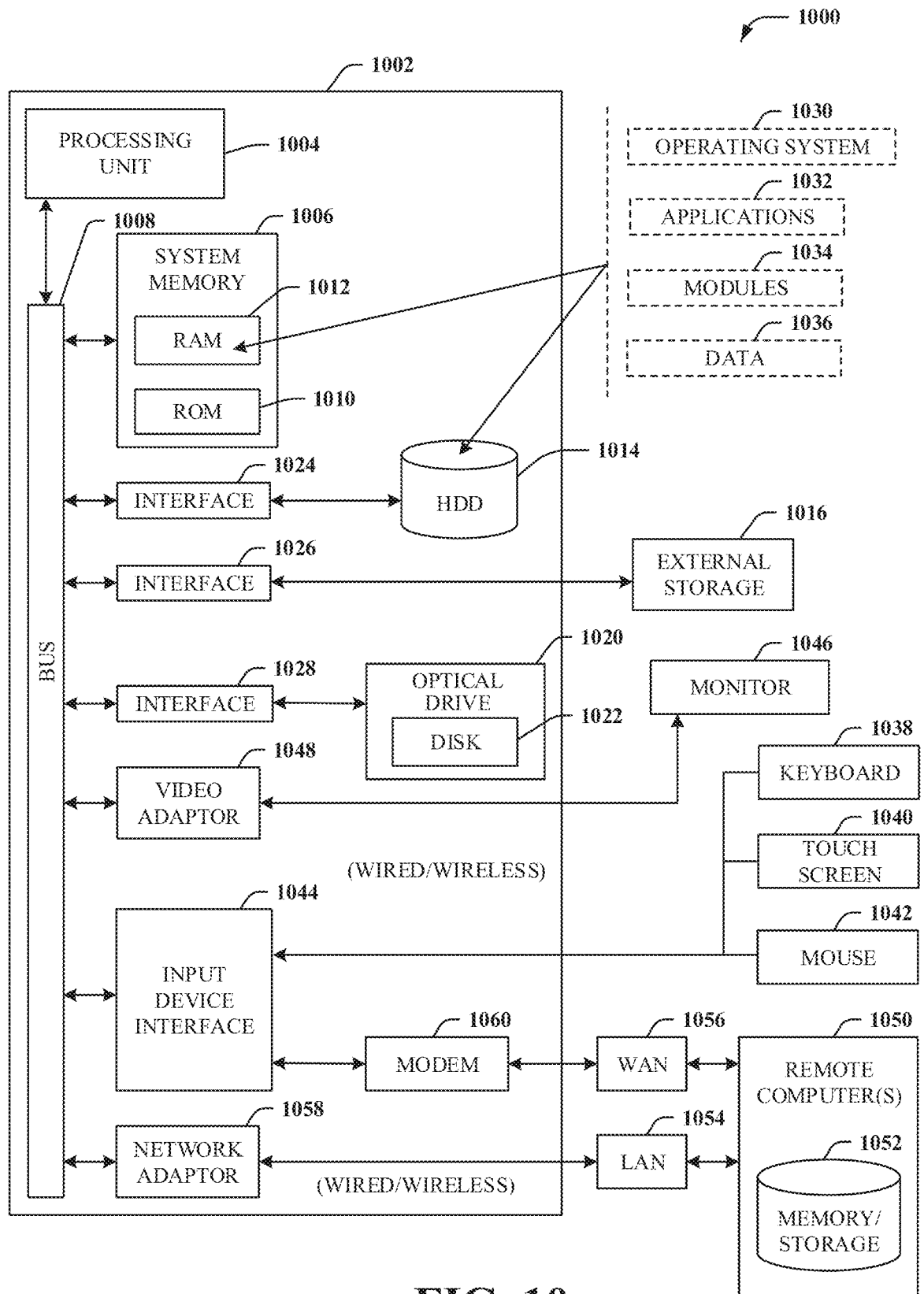
FIG. 10 illustrates an example block diagram of an example computer operable to engage in a system architecture that facilitates secure wireless communication according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
sending, by network equipment comprising a processor, registration data, representative of a user equipment attempting to register with a communication network, to server equipment via the communication network;
in response to sending the registration data to the server equipment, receiving, by the network equipment from the server equipment, update data representative of an indication that the user equipment is ready for application of a firmware update; and
in response to receiving the update data, prompting, by the network equipment, a mobility management device to modify a discontinuous reception parameter applicable to the user equipment.

2. The method of claim 1, wherein the network equipment comprises a home subscriber server.

3. The method of claim 1, further comprising:
in response to the user equipment being determined to be in proximity to a base station associated with a home subscriber server, receiving, by the network equipment, the registration data.

4. The method of claim 1, wherein the registration data comprises identification data representative of an identification of the user equipment.

5. The method of claim 1, wherein the server equipment comprises a firmware over-the-air server configured to facilitate over-the-air firmware updates to the user equipment.

6. The method of claim 1, wherein the update data is based on a comparison of the registration data to a data structure within a firmware over-the-air server.

7. The method of claim 1, wherein the discontinuous reception parameter is modified from a first time duration to a second time duration greater than the first time duration.

8. A system, comprising:
a processor; and
a memory that stores executable instructions that, when executed by the processor, facilitate performance of operations, comprising:
sending registration data, representative of a user equipment attempting to register with a service enabled via a network, to network equipment associated with the network;
in response to sending the registration data to the network equipment, facilitating comparing the registration data to a data structure of the network equipment, resulting in comparison data; and
based on the comparison data, modifying a discontinuous reception parameter associated with the user equipment, resulting in a modified discontinuous reception parameter.

9. The system of claim 8, wherein the operations further comprise:
sending the comparison data to a mobility management device associated with the network.

10. The system of claim 8, wherein the operations further comprise:
sending the modified discontinuous reception parameter to the user equipment.

11. The system of claim 8, wherein the user equipment is an internet-of-things device.

12. The system of claim 8, wherein the operations further comprise:
based on the comparison data, modifying a paging transmission time parameter associated with the user equipment.

13. The system of claim 8, wherein the operations further comprise:
based on the comparison data, modifying a paging transmission time parameter from a first time duration to second time duration greater than the first time duration.

14. The system of claim 8, wherein the operations further comprise:
based on the comparison data, modifying an idle time parameter associated with the user equipment.

15. A non-transitory machine-readable medium, comprising executable instructions that, when executed by a processor, facilitate performance of operations, comprising:
in response to receiving tracking area update data representative of a user equipment initiating a registration with a base station associated with a network, sending the tracking area update data to a server that is part of the network;
in response to sending the tracking area update data to the server, facilitating comparing the tracking area update data to a data structure managed by the server, resulting in comparison data; and
based on the comparison data, modifying a reception value associated with the user equipment, resulting in a modified reception value.

16. The non-transitory machine-readable medium of claim 15, wherein the reception value is a discontinuous reception value of the user equipment.

17. The non-transitory machine-readable medium of claim 15, wherein the operations further comprise:
in response to modifying a discontinuous reception value of the user equipment, sending firmware to the user equipment in accordance with the modified reception value.

18. The non-transitory machine-readable medium of claim 15, wherein the operations further comprise:
in response to sending firmware to the user equipment and after a time duration associated with a discontinuous reception value of the user equipment being determined to have lapsed, instructing the user equipment to return to being configured with a default discontinuous reception value less than the modified reception value.

19. The non-transitory machine-readable medium of claim 15, wherein the reception value is a paging transmission time parameter of the user equipment.

20. The non-transitory machine-readable medium of claim 15, wherein the reception value is an idle time parameter of the user equipment.

* * * * *